(12) United States Patent
Nilsson et al.

(10) Patent No.: US 6,199,284 B1
(45) Date of Patent: Mar. 13, 2001

(54) METAL SHEARS WITH MECHANICAL ADVANTAGE

(75) Inventors: Thomas Nilsson, Stockholm; Håkan Bergkvist, Bromma; Frederic Delaunay, Enköping, all of (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/274,884

(22) Filed: Mar. 23, 1999

(30) Foreign Application Priority Data

Mar. 26, 1998 (SE) .................................................... 9801012

(51) Int. Cl.⁷ ............................. B26B 13/06; B26B 13/26
(52) U.S. Cl. .................................. 30/250; 30/254; 30/257
(58) Field of Search ........................... 30/254, 257, 250, 30/251

(56) References Cited

U.S. PATENT DOCUMENTS

| | | |
|---|---|---|
| 1,533,039 | 4/1925 | Shirk . |
| 2,449,561 | 9/1948 | McGary et al. . |
| 2,529,171 | 11/1950 | Menser . |
| 3,090,121 | 5/1963 | Chonka . |
| 3,572,192 | 3/1971 | Juras . |
| 4,502,222 | 3/1985 | Sargent . |
| 5,058,277 | 10/1991 | Kishimoto . |

FOREIGN PATENT DOCUMENTS

| | | | |
|---|---|---|---|
| 273 475 | 5/1951 | (CH) . | |
| 1404 | * 1/1886 | (GB) | ...................................... 30/257 |
| 318 086 | 10/1929 | (GB) . | |
| 557865 | * 2/1957 | (IT) | ...................................... 30/257 |

* cited by examiner

Primary Examiner—Douglas D. Watts
(74) Attorney, Agent, or Firm—Burns, Doane, Swecker & Mathis, L.L.P.

(57) ABSTRACT

Shears for cutting metal sheet include first and second jaws pivotably interconnected by a jaw joint. The jaws have respective cutting edges located forwardly of the jaw joint, and which are arranged to cross one another at a crossing point which moves during a cutting operation. The cutting edges are configures to cross one another at a substantially constant angle during a cutting operation. The second jaw includes an extension extending rearwardly of the jaw joint. The first jaw has a rigidly attached first gripping handle. A second gripping handle is pivotably connected to the first handle by a handle joint located rearwardly of the jaw joint. The second handle engages a surface of the extension by a sliding contact, whereby a distance between the jaw joint and the sliding contact increases during a cutting operation.

6 Claims, 1 Drawing Sheet

METAL SHEARS WITH MECHANICAL ADVANTAGE

BACKGROUND OF THE INVENTION

The invention pertains to metal-cutting shears.

When using metal-cutting shears to cut sheet metal, one tries usually to utilize a large part of the length of the jaws for each cut, before opening the shears to start a new cut. The force on the jaws is very local occurring just where they cross one another, i.e., the point where the metal sheet is being parted. This is in contrast with secateurs or cable cutters where the force is distributed over a greater length of the jaw, corresponding to the diameter of the branch or cable. In sheet metal cutting, the force depends on the angle between the jaw edges, i.e., a large force when the angle is small, and a smaller force when the angle is larger. In simple metal-cutting shears, the jaws are straight, and the angle between them is reduced when the jaws get closed. For such shears the force increases successively during the cut, and at the same time the force and the crossing point are moved forward to progressively greater distances from the joint, which increases the leverage. The operator must then press the handles together with a sharply increasing force, and the full length of the jaws can not be used for cutting of thick metal, which must then be cut with very many small cutting motions, all of them with the handles far apart, which is uncomfortable and tiring for the hand, and which will produce jagged edges of the metal sheet.

It is earlier known from McGary et al. U.S. Pat. No. 2,449,561 to make the upper jaw curved to make the crossing angle and the jaw force less variable. German Patent No. 42 11 591 shows both jaws slightly curved, for the same purpose, and also shows how the leverage can be made variable by not attaching the lower jaw to the upper handle, but rather letting it be moved by a cam mechanism including a roller. This means that the lower handle griped by the user's fingers will be almost immobile when cutting, while the upper handle gripped by the user's thumb and wrist will move. This causes exhaustion of the hand. The leverage is not varied in such a way that the gripping force of the fingers is fully constant. Producing variable leverage by a sliding cam action is also known from secateurs or loppers through Kishimoto U.S. Pat. No. 5,058,277, but the gripping force will decrease markedly when the handles are closed, and that design is suited for cutting branches or cables, but not sheet metal.

Shirk U.S. Pat. No. 1,533,039 shows shears where no effort has been made to keep the cutting force at the jaws constant, and where the jaws are not shaped to let both handles be held at the same side of the sheet material. Sargent U.S. Pat. No. 4,502,222 shows metal shears where both handles are on the same side of the sheet material, but no effort has been made to keep the cutting force constant, and the leverage is obtained with a four joint design. Curved jaw edges are known from Juras U.S. Pat. No. 3,572,192, but they are not shaped to ensure a constant cutting force.

SUMMARY OF THE INVENTION

The present invention concerns sheet metal-cutting shears which allow the lower jaw and the upper handle to be immobile while cutting, and which has a leverage adapted to the displacement of the jaw crossing point to.

In particular, the shears include first and second jaws which are pivotably interconnected by a jaw joint. The first and second jaws have respective first and second cutting edges located in a forward direction from the jaw joint. The first and second cutting edges are arranged to cross one another at a crossing point which moves during a cutting operation. At least one of the cutting edges is curved. The second jaw includes an extension extending radially of the jaw joint. First and second handles are adapted to be gripped by a user's hand. The first handle is rigid with the first jaw, and the second handle is pivotably connected to the first handle by a handle joint which is located in a direction rearwardly from the jaw joint. The cutting edges are configured to cross one another at a substantially constant angle during a cutting operation. The second handle engages a surface of the extension by a sliding contact, whereby a distance between the jaw joint and the sliding contact increases during a cutting operation.

BRIEF DESCRIPTION OF THE DRAWING

The objects and advantages of the invention will become apparent from the following detailed description of preferred embodiments thereof in connection with the accompanying drawing in which like numerals designate like elements, and in which.

DETAILED DESCRIPTION OF PREFERRED EMBODIMENTS OF THE INVENTION

Figure 1:
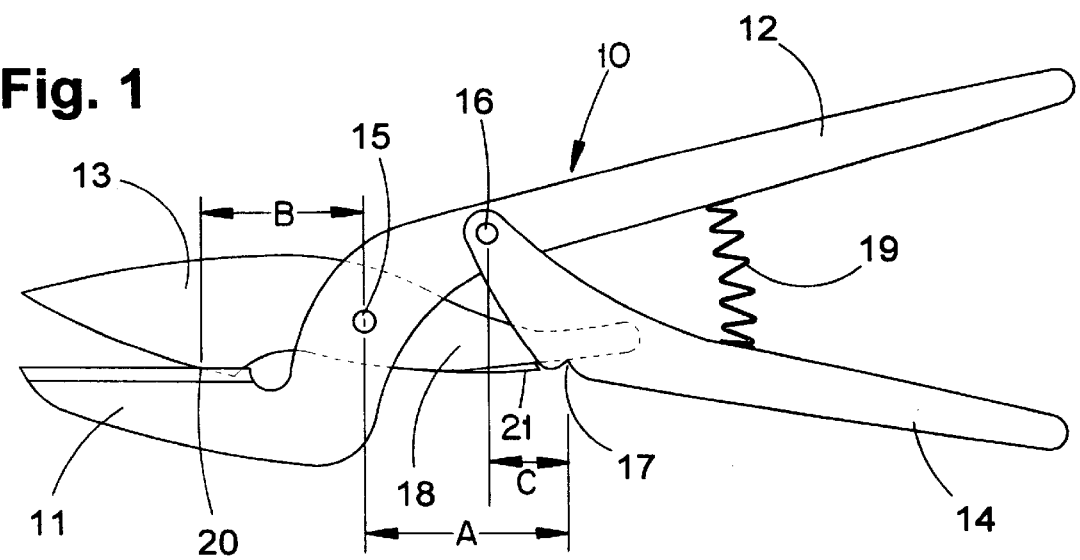
FIG. 1 shows the shears fully opened.

Shears (10) according to the invention comprise two jaws (11, 13) and two handles (12, 14), where a first handle (12) is rigidly attached to a first jaw (11), and a second handle (14) exerts a force on a second jaw (13) through a sliding contact point, the motion of which is such that the ratio between: (i) the cutting force at the jaw crossing point, and (ii) the gripping force of the operator at the handles, is independent of the angle between the handles.

More specifically, the first handle (12) is rigidly attached to the first jaw (11). The jaws (11, 13) are pivotably connected to each other at a jaw joint (15), and the handles are connected to each other at a handle joint (16). Preferably, the second jaw (13) and both handles (12, 14) are located on the same side of the sheet metal when cutting, and the first jaw (11) is located on the other side, shown in the figures as the underside. The first handle (12), held by the user's thumb and wrist, can then be held immobile when cutting, while the second handle (14) is moved by the user's fingers.

At least one of the jaws, preferably the upper or second jaw (13), is provided with a convexly curved cutting edge to make the angle between the cutting edges where they cross at a jaw crossing point (20) basically constant during a cutting motion. If the edge of the first jaw (11) is straight, then the edge of the second jaw (13) should have basically the same curvature as part of a logarithmic spiral curve, which means that a line from the jaw joint (15) will intersect the curve at the same angle at all points of the curve.

Figure 2:
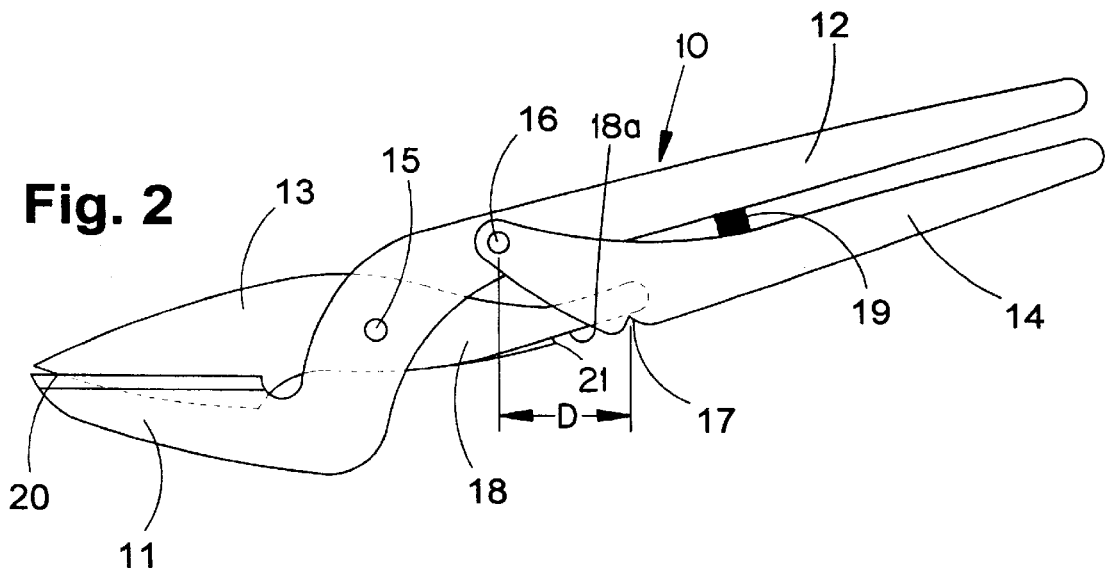
FIG. 2 shows the shears fully closed.

The jaws are biased apart by an opening spring (19). The second jaw (13) has, located behind the jaw joint (15), an extension (18) which is preferably partly inserted in an opening in the second handle (14). When the handles are pressed together, the force form the second handle (14) is acting on the extension (18) through sliding contact at a contact point (17). When the angle between the handles is decreased, the contact point (17) is moved rearwardly along a surface (18a) of the extension (18) away from the jaw joint (15) to make the distance (A) between the contact point (17) and the jaw joint (15) increase, preferably at about the same rate as the distance (B) between the jaw joint (15) and the jaw crossing point (20) increases. The contour of the surface (18a) acted on by the contact point (17) should be curved and convex. The contact point is preferably made as a protrusion on the inside surface of the opening in the second handle (14), made for instance as a local wall thickening or as a local inward deformation. The maximal extent of opening between the handles when they are pried apart by the spring (19) and not held by the user's fingers, is limited by a step (21) formed on the extension for abutting against the edge of the opening in the second handle (14). The contact point (17) is situated rearwardly of the handle joint (16) when the jaws are fully open (FIG.. 1) or fully closed (FIG. 2). In that regard, note the rearward spacing C in FIG. 1, and the rearward spacing D in FIG. 2.

Figure 3:
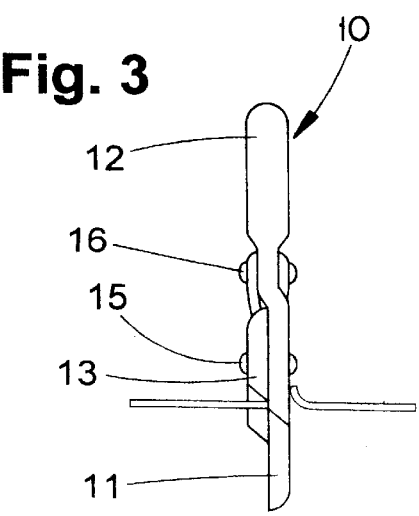
FIG. 3 shows a front view of a first embodiment of the shears with a common cutting and joint surface.

Metal-cutting shears according to the invention can be made with jaws and a jaw joint of known design, such as shown in FIG. 3 with both of the cutting edges located in the plane of the jaw joint, which is simple and inexpensive to make since the edges and the joint surfaces can be made in one operation with simple requirements of flatness. But those shears require relatively high cutting forces and may damage the sheet metal on the side of the lower jaw (11) where the metal must be bent to the side to pass by the jaw joint (15).

Figure 4:
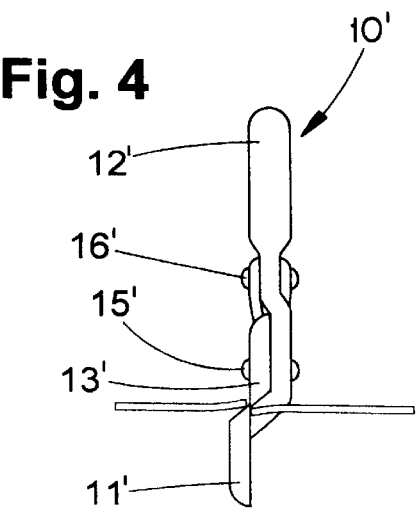
FIG. 4 shows a front view of a second embodiment of the shears with offset cutting and joint surfaces.

Alternatively, metal shears (10') can be made with the plane of the edges offset from the joint plane as known from U.S. Pat. No. 3,090,121 as shown in FIG. 4, which allows lower cutting forces and does not damage the sheet metal edges which will easily pass by the jaw joint (15), but this design is more costly since the edges and the joint surfaces must be made in separate operations with high demands on relative position. The parts shown in FIG. 4 which correspond to parts of FIGS. 1–3 are given the same reference numerals with a prime symbol.

A third possible design (not shown) is known from U.S. Pat. No. 2,529,171 which discloses a nibbling type of jaws where the lower jaw has cutting edges on both sides, and the upper jaw is double with one cutting edge on each side of the lower jaw. Such a design is appropriate where it is desirable that none of the metal sheet edges be deformed even when making curved cuts.

In all three of the above-described designs, it is preferred that a tangent line to the cutting edge of the first jaw pass below the jaw joint (15) to ensure that both handles can be held with one hand on the same side of the metal sheet without touching the metal sheet with the fingers.

It is also possible within the scope of the invention to lower friction or wear by providing a roller or a layer of low friction material at the contact point (17).

The shears are intended for the cutting of any kind of stiff sheet material, mainly sheet metal, but also wire mesh, stiff polymer sheet, stiff cardboard, thin-walled tubes, mineral sheet, composites and similar materials.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. Shears for cutting stiff sheet materials, comprising:

first and second jaws pivotably interconnected by a jaw joint, the first and second jaws having respective first and second cutting edges located in a forward direction from the jaw joint, the first and second cutting edges arranged to cross one another at a crossing point which moves during a cutting operation, at least one of the cutting edges being curved, the second jaw including an extension extending in a rearward direction from the jaw joint, and first and second handles adapted to be gripped by a user's hand, the first handle being rigid with the first jaw, the second handle pivotably connected to the first handle by a handle joint located rearwardly of the jaw joint;

the cutting edges configured to cross one another at a substantially constant angle during a cutting operation;

the second handle engaging a surface of the extension by a moving contact which is fixed relative to the second handle and movable relative to the extension, the handle joint being located wherein a distance between the jaw joint and the moving contact increases during a cutting operation, the sliding contact disposed rearwardly of the handle joint when the jaws are fully open and fully closed.

2. The shears according to claim 1 wherein the second handle includes an opening receiving the extension.

3. The shears according to claim 2 wherein a surface of the second handle which forms the opening includes a projection engaging the surface of the extension to form the moving contact.

4. The shears according to claim 1 wherein one of the jaws and both handles are arranged to be disposed on the same side of a sheet material during a cutting operation.

5. The shears according to claim 1 wherein the one cutting edge is convexly curved, and the other cutting edge is straight.

6. The shears according to claim 1 further including a spring for biasing the first and second handles apart.

* * * * *